United States Patent
Dong

(10) Patent No.: US 11,386,934 B2
(45) Date of Patent: Jul. 12, 2022

(54) METHOD AND DEVICE FOR DISPLAYING TARGET OBJECT

(71) Applicant: Hangzhou Hikvision Digital Technology Co., Ltd., Zhejiang (CN)

(72) Inventor: Maofei Dong, Zhejiang (CN)

(73) Assignee: Hangzhou Hikvision Digital Technology Co., Ltd., Zhejiang (CN)

(*) Notice: Subject to any disclaimer, the term of this patent is extended or adjusted under 35 U.S.C. 154(b) by 15 days.

(21) Appl. No.: 16/478,892

(22) PCT Filed: Jan. 10, 2018

(86) PCT No.: PCT/CN2018/072023
§ 371 (c)(1),
(2) Date: Jul. 18, 2019

(87) PCT Pub. No.: WO2018/133712
PCT Pub. Date: Jul. 26, 2018

(65) Prior Publication Data
US 2019/0387184 A1    Dec. 19, 2019

(30) Foreign Application Priority Data
Jan. 20, 2017   (CN) .......................... 201710042302.9

(51) Int. Cl.
*G06V 20/40* (2022.01)
*G11B 27/30* (2006.01)

(52) U.S. Cl.
CPC .......... *G11B 27/3081* (2013.01); *G06V 20/46* (2022.01)

(58) Field of Classification Search
CPC .... H04N 5/2624; H04N 7/18; H04N 5/23219; H04N 21/4316; H04N 7/181;
(Continued)

(56) References Cited

U.S. PATENT DOCUMENTS 6,871,009 B1 * 3/2005 Suzuki .................. H04N 5/765
386/326
7,539,349 B2 * 5/2009 Brokish .................. H04N 1/62
382/254
(Continued)

FOREIGN PATENT DOCUMENTS

CN       102622580 A        8/2012
CN       103095997 A        5/2013
(Continued)

OTHER PUBLICATIONS

Extended European Search Report issued in corresponding European Patent Application No. 18741664.9, dated Apr. 14, 2020.
(Continued)

*Primary Examiner* — Helen Shibru
(74) *Attorney, Agent, or Firm* — Meunier Carlin & Curfman LLC

(57) ABSTRACT

Embodiments of the present application provide a method and apparatus for displaying objects. In the method, video frames that contain objects of predefined types are detected in pieces of video data to be displayed in a first display region. If such video frames are detected, the objects of the predefined types are extracted from the detected video frames. The extracted objects are then displayed in sub-regions of a second display region that is different from the first display region, with each object being displayed in one of the sub-regions. In this way, the objects that a user is interested in can be extracted from a video, and displayed in a way to be viewed with ease.

8 Claims, 7 Drawing Sheets

(58) Field of Classification Search
CPC ........... G11B 27/3081; G06K 9/00744; G06K 9/00228; G08B 13/19678; G06T 7/00; G06F 3/048
USPC ................................ 386/230, 278, 289, 290
See application file for complete search history.

(56) References Cited

U.S. PATENT DOCUMENTS

| | | | |
|---|---|---|---|
| 7,558,408 B1 | 7/2009 | Steinberg et al. | |
| 8,285,006 B2 | 10/2012 | Tang | |
| 9,019,413 B2* | 4/2015 | Ecrement | H04N 5/272 348/333.01 |
| 9,137,506 B2* | 9/2015 | Kim | H04N 5/23248 |
| 9,363,220 B2* | 6/2016 | Ubillos | G06F 3/04842 |
| 2008/0240563 A1 | 10/2008 | Takano et al. | |
| 2009/0244354 A1 | 10/2009 | Sakaguchi | |
| 2010/0013977 A1 | 1/2010 | Suzuki | |
| 2012/0194336 A1 | 8/2012 | Thiruvengada et al. | |
| 2013/0091432 A1 | 4/2013 | Shet et al. | |
| 2013/0155229 A1 | 6/2013 | Thornton et al. | |
| 2014/0218520 A1 | 8/2014 | Teich et al. | |
| 2014/0253791 A1* | 9/2014 | Koskinen | H04N 5/23251 348/362 |
| 2014/0267387 A1* | 9/2014 | Bae | G06F 3/04842 345/625 |
| 2015/0212719 A1 | 7/2015 | Gottschlag et al. | |
| 2016/0173726 A1* | 6/2016 | Ubillos | G06F 3/0482 715/838 |
| 2016/0373654 A1* | 12/2016 | Kwon | H04N 5/23293 |
| 2017/0280066 A1* | 9/2017 | Hayashi | H04N 5/23232 |

FOREIGN PATENT DOCUMENTS

| | | |
|---|---|---|
| CN | 103198110 A | 7/2013 |
| CN | 103235938 A | 8/2013 |
| CN | 103873819 A | 6/2014 |
| CN | 105070053 A | 11/2015 |
| CN | 105075237 A | 11/2015 |
| CN | 105472348 A | 4/2016 |
| CN | 105723703 A | 6/2016 |
| JP | 2000298540 | 10/2000 |
| JP | 2000339923 | 12/2000 |
| JP | 2004151820 | 5/2004 |
| JP | 2007174589 | 7/2007 |
| JP | 2013179498 | 9/2013 |
| JP | 2014168126 | 9/2014 |
| JP | 2014229103 | 12/2014 |
| JP | 2015106843 A * | 6/2015 |
| JP | 2015159520 | 9/2015 |
| WO | 2010124062 A1 | 10/2010 |

OTHER PUBLICATIONS

First Office Action in corresponding Japanese Application No. 2019-539288, dated Jun. 16, 2020.
First Office Action in corresponding Korean Application No. 10-2019-7023551, dated Jun. 13, 2020.
Communication pursuant to Rule 164(1) EPC, issued in EP 18741664.9 dated Dec. 12, 2019.

* cited by examiner

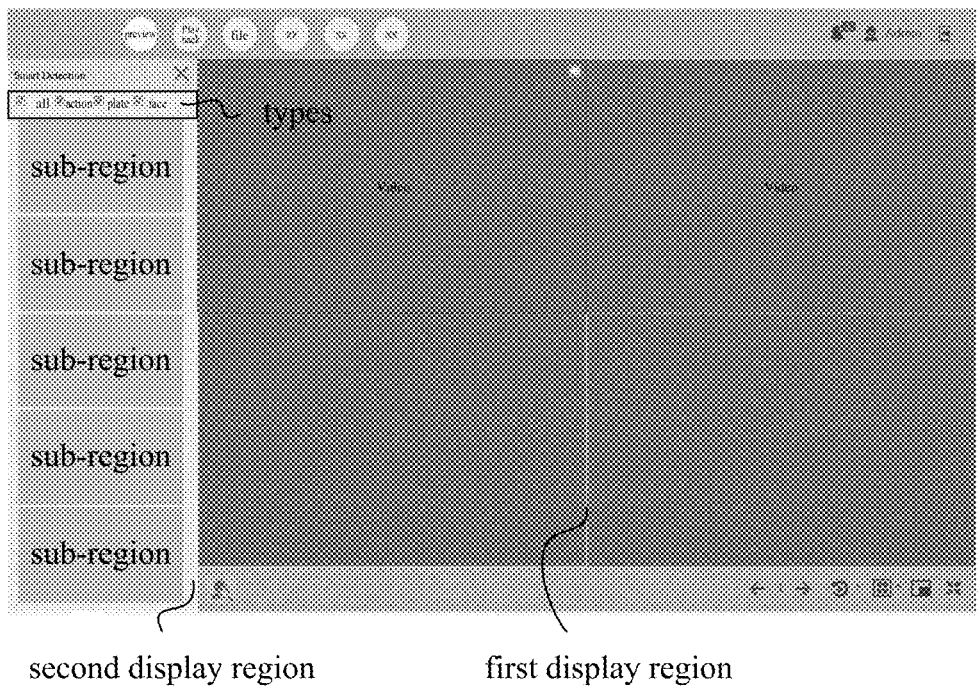

FIG. 3

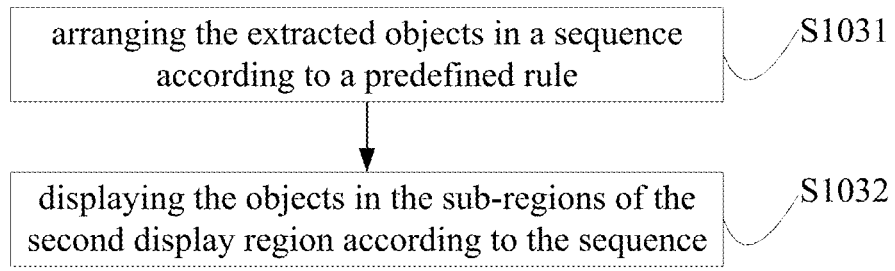

FIG. 4

| license plate $B_5$ | license plate $B_6$ | license plate $B_7$ | license plate $B_7$ |
|---|---|---|---|
| license plate $B_4$ | license plate $B_5$ | license plate $B_6$ | license plate $B_5$ |
| license plate $B_3$ | license plate $B_4$ | license plate $B_5$ | license plate $B_6$ |
| license plate $B_2$ | license plate $B_3$ | license plate $B_4$ | license plate $B_4$ |
| license plate $B_1$ | license plate $B_2$ | license plate $B_3$ | license plate $B_3$ |
| FIG. 5(a) | FIG. 5(b) | FIG. 5(c) | FIG. 5(d) |

METHOD AND DEVICE FOR DISPLAYING TARGET OBJECT

The present application claims the priority to Chinese Patent Application No. 201710042302.9, filed with the China National Intellectual Property Administration on Jan. 20, 2017 and entitled "Method and Device for Displaying Target Object", which is incorporated herein by reference in its entirety.

TECHNICAL FIELD

The present application relates to the field of image display, and in particular to a method and apparatus for displaying objects.

BACKGROUND

In general, pieces of video data can now be obtained from multiple video acquisition devices and displayed in display regions to be reviewed by a user.

Depending on characteristics of a scenario for which the video data is obtained, an object of a certain type, such as a license plate or a face, may be of more interest to users. A review of such an object of interest, however, may require much effort due to the fact that the object is typically a fraction of an image. This is particularly true for a complex image. It is thus a pressing issue to improve the ease of reviewing an object of interest.

SUMMARY

The objective of embodiments of the present application is to provide a method and apparatus for displaying objects to distinctly display objects of a user's interest, such that the user can view the objects with ease. The following embodiments are provided.

A method for displaying objects is provided. The method is applicable to an electronic device and includes:

detecting, in pieces of video data to be displayed in a first display region, if there are video frames that contain objects of predefined types;

if video frames that contain objects of the predefined types are detected, extracting the objects of the predefined types from the detected video frames; and displaying the extracted objects in sub-regions of a second display region that is different from the first display region, with each object being displayed in one of the sub-regions.

Optionally, detecting, in pieces of video data to be displayed in a first display region, if there are video frames that contain objects of predefined types, includes:

performing object detection for objects of the predefined types to video frames in the pieces of video data to be displayed in the first display region; and determining, based on a result of the object detection, if there are video frames that contain the objects of the predefined types.

Optionally, before performing object detection for objects of the predefined types to video frames in the pieces of video data to be displayed in the first display region, the method for displaying objects according to an embodiment further includes:

determining if the object detection for objects of the predefined types is supported by video acquisition devices that acquired the pieces of video data; and if not supported, performing the object detection for objects of the predefined types to video frames in the pieces of video data to be displayed in the first display region.

Optionally, the method for displaying objects according to an embodiment further includes:

if the video acquisition devices support the object detection, determining if there are video frames that contain the objects of the predefined types, according to a result of the object detection for objects of the predefined types performed by the video acquisition devices to video frames in the pieces of video data to be displayed in the first display region.

Optionally, extracting the objects of the predefined types from the detected video frames, includes:

extracting objects of the predefined types that are different from reference objects from the detected video frames, wherein the reference objects are of the predefined types and are extracted from previously detected video frames.

Optionally, displaying the extracted objects in sub-regions of a second display region, includes:

arranging the extracted objects in a sequence according to a predefined rule;

and displaying the objects in the sub-regions of the second display region according to the sequence.

Optionally, the sub-regions of the second display region are longitudinally distributed; and displaying the objects in the sub-regions of the second display region according to the sequence, includes:

displaying the objects from bottom to top in the sub-regions of the second display region according to the sequence;

determining if any of the extracted objects has not been displayed in the sub-regions; and if so, removing a first object in the lowest sub-region, sequentially moving other displayed objects than the first object into respective sub-regions adjacently below, displaying an object, that has not been displayed, in the uppermost sub-region, and proceeding back to determination as to if any of the extracted objects has not been displayed in the sub-regions;

or wherein, the sub-regions of the second display region are transversely distributed; and displaying the objects in the sub-regions of the second display region according to the sequence includes:

displaying the objects from left to right in the sub-regions of the second display region according to the sequence;

determining if any of the extracted objects has not been displayed in the sub-regions; and if so, removing a second object in the leftmost sub-region, sequentially moving other displayed objects than the second object into respective sub-regions adjacently on the left, displaying an object, that has not been displayed, in the rightmost sub-region, and proceeding back to the determination as to if any of the extracted objects has not been displayed in the sub-regions.

Optionally, after displaying the extracted objects in sub-regions of a second display region, the method for displaying objects according to an embodiment further includes:

obtaining an object selection instruction including a target type for a selected object;

identifying objects of other types than the target type from the objects being displayed in the second display region according to the object selection instruction;

and removing the objects of other types from the second display region.

Optionally, after displaying the extracted objects in sub-regions of a second display region, the method for displaying objects according to an embodiment further includes:

obtaining a video playback instruction for a third object;

determining video data for the third object, which contains video frames having the third object; and playing back the determined video data in a third display region.

Optionally, after displaying the extracted objects in sub-regions of a second display region, the method for displaying objects according to an embodiment further includes:

determining information about video acquisition devices for the objects; and displaying the information about the video acquisition devices for the objects in corresponding sub-regions that are displaying the objects.

An apparatus for displaying objects is provided. The apparatus is applicable to an electronic device and includes:

a detection module configured for detecting, in pieces of video data to be displayed in a first display region, if there are video frames that contain objects of predefined types; and triggering an extracting module if video frames that contain objects of the predefined types are detected;

the extracting module configured for extracting the objects of the predefined types from the detected video frames; and a displaying module configured for displaying the extracted objects in sub-regions of a second display region that is different from the first display region, with each object being displayed in one of the sub-regions.

Optionally, the detection module includes:

an object detection subunit configured for performing object detection for objects of the predefined types to video frames in the pieces of video data to be displayed in the first display region; and a video frame determination subunit configured for determining, based on a result of the object detection, if there are video frames that contain the objects of the predefined type.

Optionally, the apparatus for displaying objects according to an embodiment further includes:

a determining module configured for determining if the object detection for objects of the predefined types is supported by video acquisition devices that acquired the pieces of video data, before performing object detection for objects of the predefined types to video frames in the pieces of video data to be displayed in the first display region; and if not supported, triggering the object detection subunit.

Optionally, the apparatus for displaying objects according to an embodiment further includes:

a determination module configured for, if the determining module determines that the video acquisition devices support the object detection, determining if there are video frames that contain the objects of the predefined types, according to a result of the object detection for objects of the predefined types performed by the video acquisition devices to video frames in the pieces of video data to be displayed in the first display region.

Optionally, the extracting module is further configured for:

extracting objects of the predefined types that are different from reference objects from the detected video frames, wherein the reference objects are of the predefined types and are extracted from previously detected video frames.

Optionally, the displaying module includes:

an arranging subunit configured for arranging the extracted objects in a sequence according to a predefined rule; and an object displaying subunit configured for displaying the objects in the sub-regions of the second display region according to the sequence.

Optionally, the sub-regions of the second display region are longitudinally distributed, and the object displaying subunit includes:

a first displaying sub-module configured for displaying the objects from bottom to top in the sub-regions of the second display region according to the sequence;

a first object determining sub-module configured for determining if any of the extracted objects has not been displayed in the sub-regions, and if so, triggering a first updating sub-module; and the first updating sub-module configured for removing a first object in the lowest sub-region, sequentially moving other displayed objects than the first object into respective sub-regions adjacently below, displaying an object, that has not been displayed, in the uppermost sub-region, and triggering the first object determining sub-module;

or wherein, the sub-regions of the second display region are transversely distributed, and the object displaying subunit includes:

a second displaying sub-module configured for displaying the objects from left to right in the sub-regions of the second display region according to the sequence;

a second object determining sub-module configured for determining if any of the extracted objects has not been displayed in the sub-regions, and if so, triggering a second updating sub-module; and the second updating sub-module configured for removing a second object in the leftmost sub-region, sequentially moving other displayed objects than the second object into respective sub-regions adjacently on the left, displaying an object, that has not been displayed, in the rightmost sub-region, and triggering the second object determining sub-module.

Optionally, the apparatus for displaying objects according to an embodiment further includes:

a selection instruction obtaining module configured for obtaining an object selection instruction including a target type for a selected object, after the extracted objects are displayed in the sub-regions of the second display region;

an object identification module configured for identifying objects of other types than the target type from the objects being displayed in the second display region according to the object selection instruction; and a removal module configured for removing the objects of other types from the second display region.

Optionally, the apparatus for displaying objects according to an embodiment further includes:

a video playback instruction obtaining module configured for obtaining a video playback instruction for a third object after the extracted objects are displayed in the sub-regions of the second display region;

a lookup module configured for determining video data for the third object, which contains video frames having the third object; and a playback module configured for playing back the determined video data in a third display region.

Optionally, the apparatus for displaying objects according to an embodiment further includes:

a device information determination module configured for determining information about video acquisition devices for the objects after the extracted objects are displayed in the sub-regions of the second display region; and a device information displaying module configured for displaying the information about the video acquisition devices for the objects in corresponding sub-regions that are displaying the objects.

For the objective above, embodiments of the present application provide an electronic device including a processor, a communication interface, a memory, and a communication bus, wherein the processor, the communication interface, and the memory communicate with each other via the communication bus;

the memory is configured for storing a computer program; and the processor is configured for executing the program stored on the memory to carry out operations of a method for displaying objects according to an embodiment, including:

detecting, in pieces of video data to be displayed in a first display region, if there are video frames that contain objects of predefined types;

if video frames that contain objects of the predefined types are detected, extracting the objects of the predefined types from the detected video frames; and displaying the extracted objects in sub-regions of a second display region that is different from the first display region, with each object being displayed in one of the sub-regions.

Optionally, detecting, in pieces of video data to be displayed in a first display region, if there are video frames that contain objects of predefined types, includes:

performing object detection for objects of the predefined types to video frames in the pieces of video data to be displayed in the first display region; and determining, based on a result of the object detection, if there are video frames that contain the objects of the predefined types.

Optionally, before performing object detection for objects of the predefined types to video frames in the pieces of video data to be displayed in the first display region, the method further includes:

determining if the object detection for objects of the predefined types is supported by video acquisition devices that acquired the pieces of video data; and if not supported, performing the object detection for objects of the predefined types to video frames in the pieces of video data to be displayed in the first display region.

Optionally, the method for displaying objects according to an embodiment further includes:

if the video acquisition devices support the object detection, determining if there are video frames that contain the objects of the predefined types, according to a result of the object detection for objects of the predefined types performed by the video acquisition devices to video frames in the pieces of video data to be displayed in the first display region.

Optionally, extracting the objects of the predefined types from the detected video frames, includes:

extracting objects of the predefined types that are different from reference objects from the detected video frames, wherein the reference objects are of the predefined types and are extracted from previously detected video frames.

Optionally, displaying the extracted objects in sub-regions of a second display region, includes:

arranging the extracted objects in a sequence according to a predefined rule; and displaying the objects in the sub-regions of the second display region according to the sequence.

Optionally, the sub-regions of the second display region are longitudinally distributed; and displaying the objects in the sub-regions of the second display region according to the sequence, includes:

displaying the objects from bottom to top in the sub-regions of the second display region according to the sequence;

determining if any of the extracted objects has not been displayed in the sub-regions; and if so, removing a first object in the lowest sub-region, sequentially moving other displayed objects than the first object into respective sub-regions adjacently below, displaying an object, that has not been displayed, in the uppermost sub-region, and proceeding back to determination as to if any of the extracted objects has not been displayed in the sub-regions;

or wherein, the sub-regions of the second display region are transversely distributed; and displaying the objects in the sub-regions of the second display region according to the sequence includes:

displaying the objects from left to right in the sub-regions of the second display region according to the sequence;

determining if any of the extracted objects has not been displayed in the sub-regions; and if so, removing a second object in the leftmost sub-region, sequentially moving other displayed objects than the second object into respective sub-regions adjacently on the left, displaying an object, that has not been displayed, in the rightmost sub-region, and proceeding back to the determination as to if any of the extracted objects has not been displayed in the sub-regions.

Optionally, after displaying the extracted objects in sub-regions of a second display region, the method further includes:

obtaining an object selection instruction including a target type for a selected object;

identifying objects of other types than the target type from the objects being displayed in the second display region according to the object selection instruction; and removing the objects of other types from the second display region.

Optionally, after displaying the extracted objects in sub-regions of a second display region, the method further includes:

obtaining a video playback instruction for a third object;

determining video data for the third object, which contains video frames having the third object; and playing back the determined video data in a third display region.

Optionally, after displaying the extracted objects in sub-regions of a second display region, the method further includes:

determining information about video acquisition devices for the objects; and displaying the information about the video acquisition devices for the objects in corresponding sub-regions that are displaying the objects.

For the objective above, embodiments of the present application provide a computer readable storage medium having a computer program stored thereon which, when being executed by a processor, performs operations of a method for displaying objects according to an embodiment, including:

detecting, in pieces of video data to be displayed in a first display region, if there are video frames that contain objects of predefined types;

if video frames that contain objects of the predefined types are detected, extracting the objects of the predefined types from the detected video frames; and displaying the extracted objects in sub-regions of a second display region that is different from the first display region, with each object being displayed in one of the sub-regions.

Optionally, detecting, in pieces of video data to be displayed in a first display region, if there are video frames that contain objects of predefined types, includes:

performing object detection for objects of the predefined types to video frames in the pieces of video data to be displayed in the first display region; and determining, based on a result of the object detection, if there are video frames that contain the objects of the predefined types.

Optionally, before performing object detection for objects of the predefined types to video frames in the pieces of video data to be displayed in the first display region, the method further includes:

determining if the object detection for objects of the predefined types is supported by video acquisition devices that acquired the pieces of video data; and if not supported, performing the object detection for objects of the predefined types to video frames in the pieces of video data to be displayed in the first display region.

Optionally, the method for displaying objects according to an embodiment further includes:

if the video acquisition devices support the object detection, determining if there are video frames that contain the objects of the predefined types, according to a result of the object detection for objects of the predefined types performed by the video acquisition devices to video frames in the pieces of video data to be displayed in the first display region.

Optionally, extracting the objects of the predefined types from the detected video frames, includes:

extracting objects of the predefined types that are different from reference objects from the detected video frames, wherein the reference objects are of the predefined types and are extracted from previously detected video frames.

Optionally, displaying the extracted objects in sub-regions of a second display region, includes:

arranging the extracted objects in a sequence according to a predefined rule; and displaying the objects in the sub-regions of the second display region according to the sequence.

Optionally, the sub-regions of the second display region are longitudinally distributed; and displaying the objects in the sub-regions of the second display region according to the sequence, includes:

displaying the objects from bottom to top in the sub-regions of the second display region according to the sequence;

determining if any of the extracted objects has not been displayed in the sub-regions; and if so, removing a first object in the lowest sub-region, sequentially moving other displayed objects than the first object into respective sub-regions adjacently below, displaying an object, that has not been displayed, in the uppermost sub-region, and proceeding back to determination as to if any of the extracted objects has not been displayed in the sub-regions;

or wherein, the sub-regions of the second display region are transversely distributed; and displaying the objects in the sub-regions of the second display region according to the sequence includes:

displaying the objects from left to right in the sub-regions of the second display region according to the sequence;

determining if any of the extracted objects has not been displayed in the sub-regions; and if so, removing a second object in the leftmost sub-region, sequentially moving other displayed objects than the second object into respective sub-regions adjacently on the left, displaying an object, that has not been displayed, in the rightmost sub-region, and proceeding back to the determination as to if any of the extracted objects has not been displayed in the sub-regions.

Optionally, after displaying the extracted objects in sub-regions of a second display region, the method further includes:

obtaining an object selection instruction including a target type for a selected object;

identifying objects of other types than the target type from the objects being displayed in the second display region according to the object selection instruction; and removing the objects of other types from the second display region.

Optionally, after displaying the extracted objects in sub-regions of a second display region, the method further includes:

obtaining a video playback instruction for a third object;

determining video data for the third object, which contains video frames having the third object; and playing back the determined video data in a third display region.

Optionally, after displaying the extracted objects in sub-regions of a second display region, the method further includes:

determining information about video acquisition devices for the objects; and displaying the information about the video acquisition devices for the objects in corresponding sub-regions that are displaying the objects.

In embodiments of the present application, video frames that contain objects of predefined types are detected in pieces of video data to be displayed in a first display region. If such video frames are detected, the objects of the predefined types are extracted from the detected video frames. The extracted objects are displayed in sub-regions of a second display region that is different from the first display region, with each object being displayed in one of the sub-regions. In this way, the objects that a user is interested in can be extracted from a video, and displayed in a way to be viewed with ease.

BRIEF DESCRIPTION OF THE DRAWINGS

Technical solutions of embodiments of the present application and the prior arts will be more clearly illustrated with reference to the drawings as briefly introduced below. Apparently, these drawings are only for some embodiments of the present application, and those skilled in the art can obtain other drawings based on the accompanying drawings herein without any creative efforts.

FIG. 3 is a schematic diagram of a display interface displaying objects;

FIG. 4 is a schematic flowchart of displaying extracted objects in the sub-regions of the second display region according to an embodiment of the present application;

FIG. 5(*a*) is a schematic diagram illustrating objects displayed in the sub-regions of the second display region from bottom to top;

FIG. 5(*b*) is a schematic diagram of the updating to display a license plate $B_6$ in a sub-region of the second display region;

FIG. 5(*c*) is a schematic diagram of the updating to display a license plate $B_7$ in a sub-region of the second display region;

FIG. 5(*d*) is a schematic diagram of the updating of objects when a license plate $B_5$ is selected by a user;

DETAILED DESCRIPTION

To make the objectives, technical solutions, and advantages of the present application more comprehensive, a detailed description of the present application is provided below in association with embodiments and with reference to drawings. Apparently, the described embodiments are only some of, but not all the embodiments of the present application. All other embodiments derived therefrom without any creative efforts are all within the scope of the present application.

Embodiments of the present application provide a method and apparatus for displaying objects to solve the problem in the related art.

An introduction of the method for displaying objects according to an embodiment of the present application is provided below.

It is noted that, the method for displaying objects as provided is applicable to an electronic device, such as a desktop computer or a tablet computer. All these are feasible.

Figure 1:
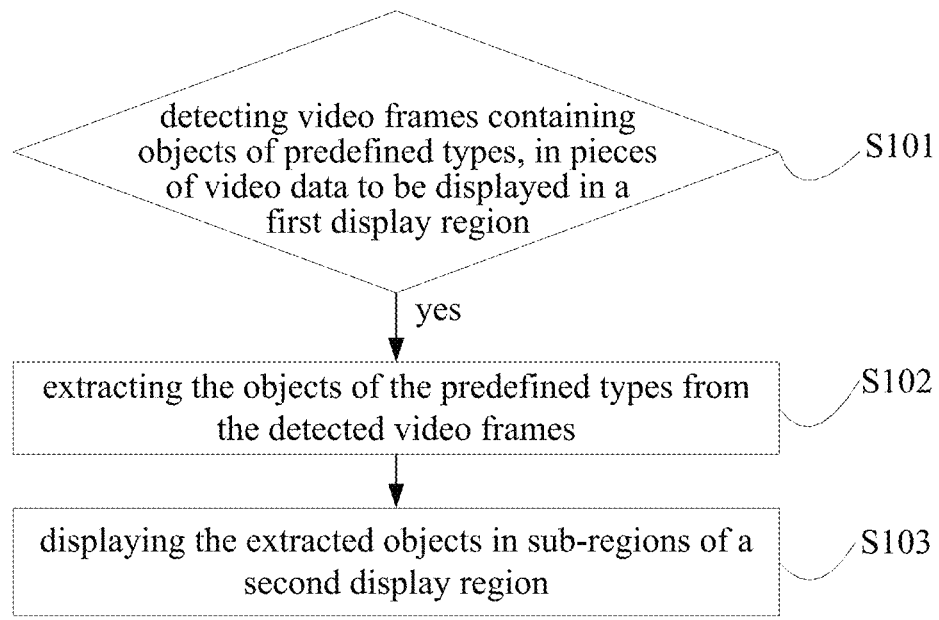
FIG. 1 is a first schematic flowchart of a method for displaying objects according to an embodiment of the present application.

The method for displaying objects, applicable to an electronic device, includes, as shown in FIG. 1, the following operations.

At S101, video frames that contain objects of predefined types are detected in pieces of video data to be displayed in a first display region. In case of such video frames, the method proceeds to S102; or otherwise, no subsequent operation is required.

The detection of video frames that contain objects of the predefined types from the pieces of video data to be displayed in a first display region is implemented so as to identify, in a video, an object that a user is interested in. The pieces of video data to be displayed in the first display region may include video data acquired previously or acquired in real time by video acquisition devices, each of which corresponding to one of the pieces of video data.

Figure 2:
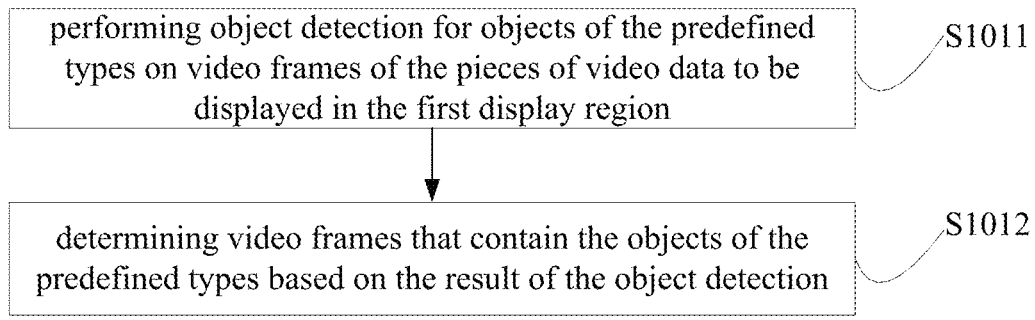
FIG. 2 is a schematic flowchart of determining video frames according to an embodiment of the present application.

The detection of video frames that contain objects of the predefined types in the pieces of video data to be displayed in the first display region may be implemented by means of object detection. In this case, S101 may include, as shown in FIG. 2, the following operations.

At S1011, object detection for objects of the predefined types is performed on video frames of the pieces of video data to be displayed in the first display region.

At S1012, video frames that contain the objects of the predefined types are determined based on the result of the object detection.

Objects can be found in video frames of video data. Therefore, object detection can be applied to the video frames of the pieces of video data to be displayed in the first display region to detect objects of the predefined types. The predefined types may be at least one of the types of human faces, license plates, and targets of an action. A target of an action may be a moving object. The object detection performed on the video frames may be any of object detection techniques known in the art, detailed description thereof is omitted herein.

The result of the object detection is used to determine if there are video frames containing objects of the predefined types.

Video acquisition devices may be of various forms, such as an IP camera or an analog camera. The object detection for objects of the predefined types may be supported by some of, but not all, these video acquisitions devices. Therefore, the method for displaying objects according to an embodiment of the present application may further includes, before S1011, the following aspects.

A determination is made as to if the video acquisition devices corresponding to the pieces of video data support object detection for objects of the predefined types. The method proceeds to S1011 if the determination result is no. Otherwise, video frames that contain the objects of the predefined types are determined according to the result of the object detection for objects of the predefined types performed, by the video acquisition devices, on video frames in the pieces of video data to be displayed in the first display region.

If the video acquisition devices do not support the object detection for objects of the predefined types, the electronic device performs the object detection for objects of the predefined type on video frames of the pieces of video data to be displayed in the first display region; and determines, based on the result of the object detection, if there are video frames that contain objects of the predefined types.

If the video acquisition devices support object detection for objects of the predefined types, the video acquisition devices may perform the object detection for objects of the predefined type on video frames of the pieces of video data to be displayed in the first display region; and transmit the result of the object detection to the electronic device. The electronic determines, based on the received result, if there are video frames containing the objects of the predefined types.

At S102, the objects of the predefined types are extracted from the detected video frames.

The objects of the predefined types are extracted from the identified video frames that contain the objects. The objects can be extracted through any object extracting technique known from the art. Details will not be provided herein.

An object of a predefined type may typically be present in several consecutive frames of a video. For example, the predefined type is a type of faces, and a face $A_1$ of a person A is present in a frame of a video. The face $A_1$ is to be found in the next frame if the person is still within the scene that the video acquisition device is capturing. As such, two faces $A_1$ would be extracted from the video frames.

To avoid a display of redundant objects, in an embodiment, the operation of extracting objects of the predefined types from the detected video frames may include:

extracting objects of the predefined types that are different from reference objects from the detected video frames.

In this way, only the objects of the predefined types that are different from the reference objects are extracted from the detected video images. The reference objects may be of the predefined types and be extracted from previously detected video frames.

For example, a reference object may be a license plate $B_1$. In a case where the license plate $B_1$ and a license plate $B_2$ are present in a detected video frame, only the license plate $B_2$ is extracted.

At S103, the extracted objects are displayed in sub-regions of a second display region.

After the objects of the predefined types are extracted from the detected video frames, a determination is made as to if a function for displaying objects of the predefined types is enabled. If the function is enabled, the extracted objects will be displayed in the sub-regions of the second display region. Otherwise, no operation is required. Each object is associated with one of the sub-regions. FIG. 3 illustrates a display interface for displaying objects therein, left for a second display region, and right for a first display region different from the second display region.

In an embodiment of the present application, the extracted objects may be displayed in the sub-regions of the second display region in a sequence. As shown in FIG. 4, S103 may include the following operations S1031~S1032.

At S1031, extracted objects are arranged in a sequence according to a predefined rule.

A plurality of predefined rules are possible, a detailed introduction of which is provided below.

In a first predefined rule, the extracted objects are temporally arranged according to moments of extraction.

For example, license plates $B_1$, $B_2$ and $B_3$ as the objects are respectively extracted at 9:00, 9:01 and 9:02, and thus are arranged, according to the first predefined rule, in a sequence of $B_1$, $B_2$ and $B_3$.

In a second predefined rule, the extracted objects are arranged according to priorities of respective types.

For example, license plates $B_1$ and $B_2$ and a human face $A_1$ as the objects are extracted. A human face has a higher priority than a license plate. The extracted objects are thus arranged, according to the second predefined rule, in a sequence of human face $A_1$, license plate $B_1$ and license plate $B_2$, or in a sequence of human face A1, license plate $B_2$ and license plate $B_1$.

At S1032, the objects are displayed in the sub-regions of the second display region according to the sequence.

The objects are displayed in the sub-regions of the second display region according to the sequence of arrangement of the objects.

The sub-regions of the second display region may be distributed in many manners. Accordingly, the objects may be displayed in the sub-regions of the second display region in various sequences. A detailed introduction of this is provided below.

In a first manner, the sub-regions of the second display region are longitudinally distributed. The objects are displayed in the sub-regions of the second display region from bottom to top according to the sequence.

In case of a large amount of objects, the sub-regions of the second display region may not be able to accommodate them all. As such, a determination may be made as to if there is any object that has not been displayed after all the sub-regions are employed to display the objects from bottom to top according to the sequence.

If there is any object that has not been displayed, the objects in the sub-regions of the second display region may be updated so that the non-displayed object can be displayed. The determination is then continued for other non-displayed objects. In particular, the objects may be updated in the following manner.

A first object in the lowest sub-region is removed. Other objects being displayed than the first object are sequentially moved downward into respective sub-regions that are adjacently below. A non-displayed object is then displayed in the uppermost sub-region.

Of course, the longitudinally distributed sub-regions of the second display region may also be utilized from top to bottom to display the objects in their sequence. This is also allowed. Embodiments are not limited in this aspect.

For example, objects of license plates $B_1$~$B_7$ are arranged in a sequence of B1, $B_2$, $B_3$, $B_4$, $B_5$, $B_6$ and $B_7$, and the sub-regions of the second display region are longitudinally distributed.

As shown in FIG. 5(a), the objects are displayed, from bottom to top according to the sequence of their arrangement, in the sub-regions of the second display region. A determination is made as to if any license plate among $B_1$~$B_7$ has not been displayed in the sub-regions. The result turns out to be license plates $B_6$ and $B_7$.

As shown in FIG. 5(b), the license plate $B_1$ is removed from the lowest sub-region. All other license plates $B_2$~$B_5$ being displayed are shifted sequentially into respective sub-regions adjacently below. One of the non-displayed license plates, e.g., $B_6$, is then displayed in the uppermost sub-region.

The determination of non-displayed license plates is continued and produces a result of license plate $B_7$.

As shown in FIG. 5(c), the first object, i.e., license plate $B_2$, is removed from the lowest sub-region. All other license plates $B_3$~$B_6$ being displayed are sequentially shifted into respective sub-regions adjacently below. The non-displayed license plate, i.e., $B_7$, is then displayed in the uppermost sub-region.

In a second manner, the sub-regions of the second display region are transversely distributed. The objects are displayed in the sub-regions of the second display region from left to right according to the sequence.

In case of a large amount of objects, the sub-regions of the second display region may not be able to accommodate them all. As such, a determination may be made as to if there is any object that has not been displayed after all the sub-regions are employed to display the objects from left to right according to the sequence.

If there is any non-displayed object, the objects in the sub-regions of the second display region may be updated so that the non-displayed object can be displayed. The determination is then continued for other non-displayed objects. The objects may be updated in the following manner.

A second object in the leftmost sub-region is removed. Other objects being displayed than the second object are sequentially shifted into respective sub-regions that are adjacently on the left. A non-displayed object is then displayed in the rightmost sub-region.

Of course, the transversely distributed sub-regions in the second display region may also be employed from right to left to display the objects in their sequence. This is also allowed. Embodiments are not limited in this aspect.

During the process of updating objects displayed in the sub-regions of the second display region to display non-displayed objects, a case may occur that an object in some sub-region of the second display regions is selected by the user. Upon this case, the updating can be suspended, and be resumed when the selection is canceled. Alternatively, the selected object can be solely excluded from updating, while other objects are still subjected to the updating.

Continuing with the previous example where the sub-regions of the second display region are longitudinally distributed. As shown in FIG. 5(*b*), while license plate $B_6$ has been displayed in a sub-region of the second display region but license plate $B_7$ has not, license plate $B_5$ is selected by the user.

As shown in FIG. 5(*d*), the license plate $B_5$ remains unchanged, and all other license plates $B_2$~$B_4$, $B_6$, and $B_7$ are subject to updating as usual.

In the embodiment, video frames that contain objects of predefined types are detected in pieces of video data to be displayed in a first display region. If such video frames are detected, the objects of the predefined types are extracted from the detected video frames. The extracted objects are displayed in sub-regions of a second display region that is different from the first display region, with each object being displayed in one of the sub-regions. In this way, the objects that a user is interested in can be extracted from a video, and displayed in a way to be viewed with ease.

Figure 6:
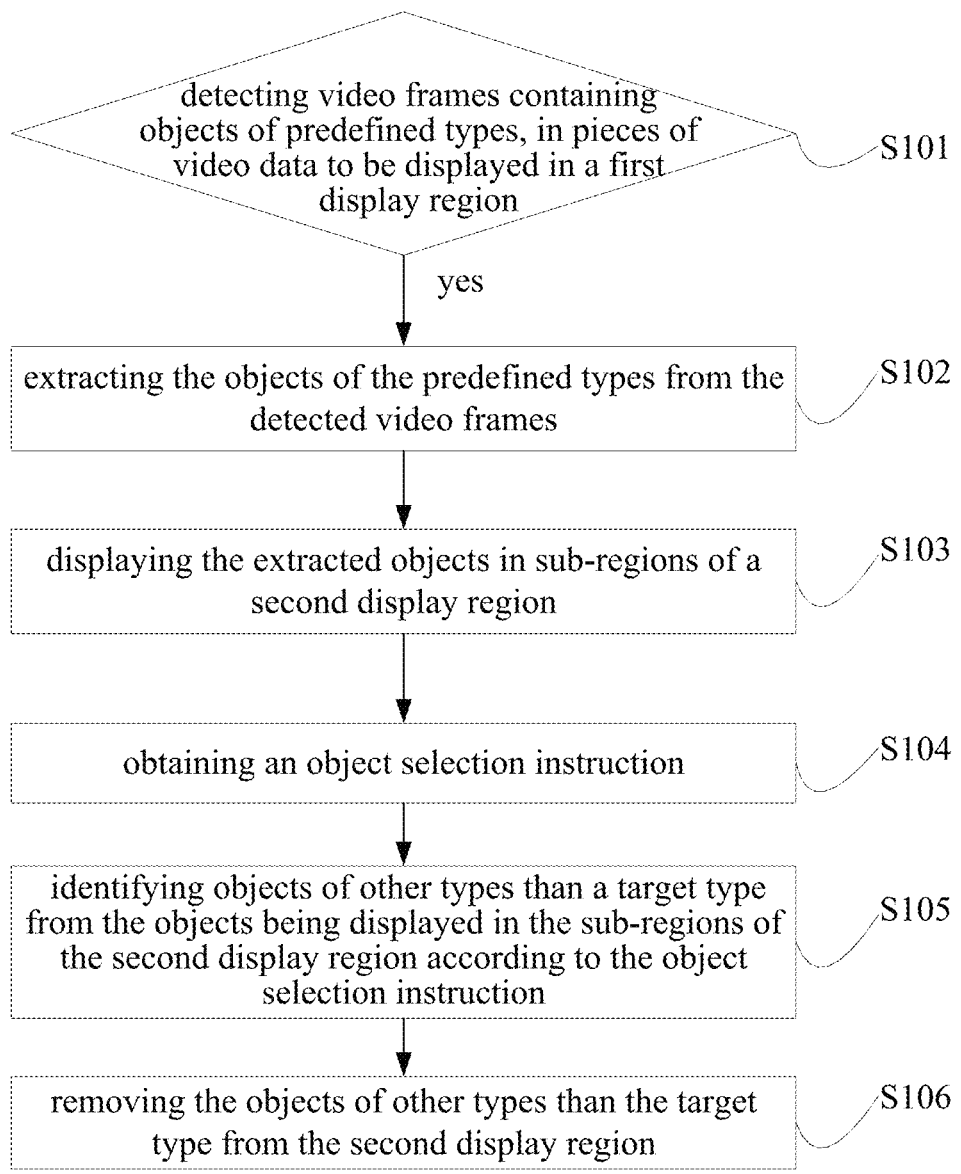
FIG. 6 is a schematic flowchart of a second method for displaying objects according to an embodiment of the present application.

An embodiment of the present application provides another method for displaying objects, including, in addition to those illustrated in FIG. 1 and after S103, the following operations as shown in FIG. 6.

At S104, an object selection instruction is obtained.

The user may select an object of a desired target type among those objects extracted and being displayed in the sub-regions of the second display region. For example, as shown in FIG. 3, the object type of a subject of an action (e.g., a moving subject), a human face, and a license plate are selected to be displayed in the sub-regions of the second display region. The user may select only the human face. The electronic device then receives an object selection instruction containing the selected target type of the object, i.e., a human face.

At S105, objects of other types than the target type are identified from the objects being displayed in the sub-regions of the second display region according to the object selection instruction.

To solely display objects of the target type as desired by the user, other types than the target type are to be identified from the predefined types. Objects of other types are then identified from the objects being displayed in the sub-regions of the second display region.

At S106, the objects of other types are removed from the second display region.

The objects of other types as identified are removed from the second display region so that only objects of the selected target type are now displayed in the second display region.

The removal of the objects of other types than the target type from the second display region achieves the purpose of solely displaying objects of a desired target type.

Figure 7:
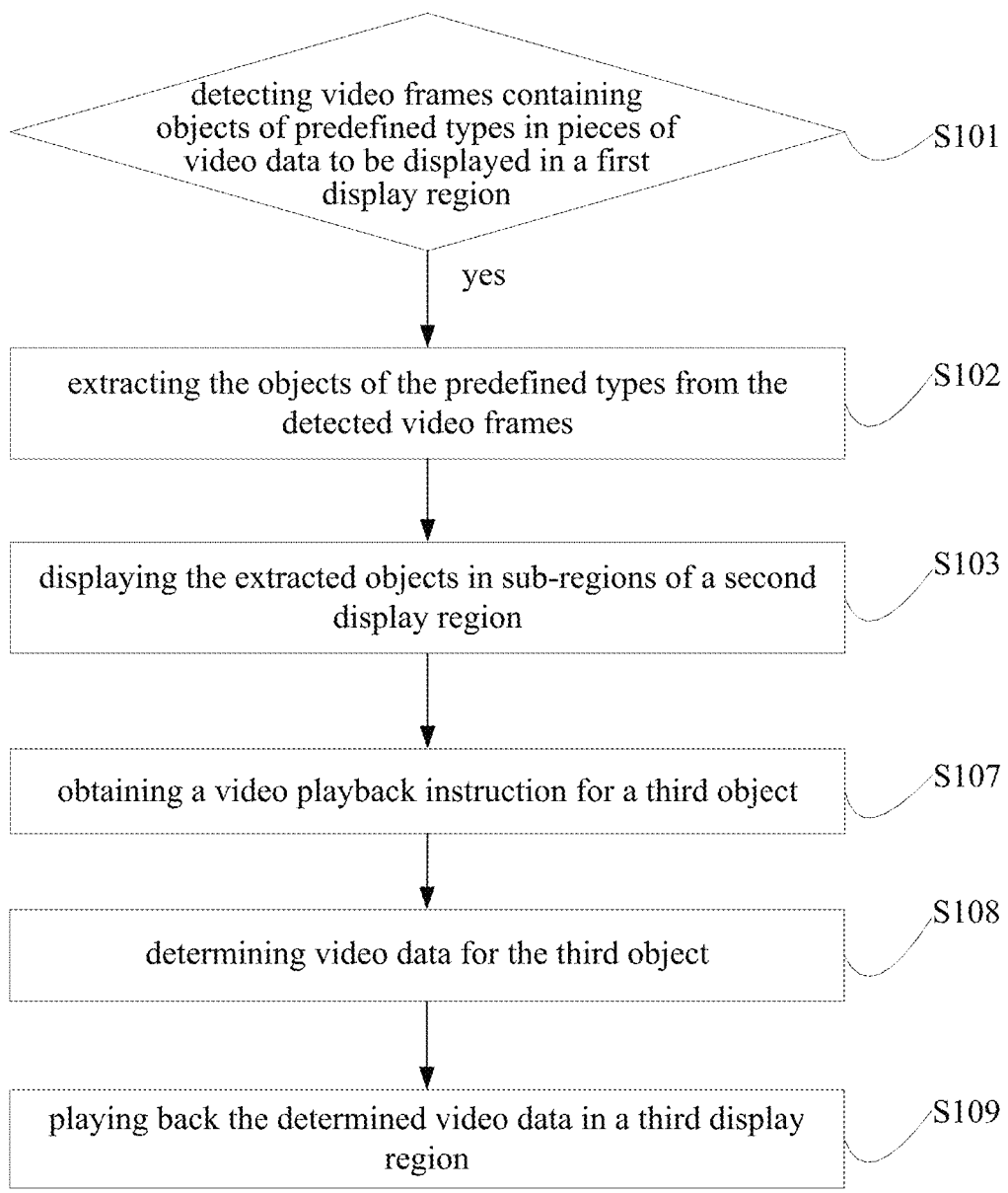
FIG. 7 is a schematic flowchart of a third method for displaying objects according to an embodiment of the present application.

An embodiment of the present application provides another method for displaying objects, including, in addition to those illustrated in FIG. 1 and after S103, the following operations as shown in FIG. 7.

At S107, a video playback instruction for a third object is obtained.

To have better knowledge of information related to the objects, the user may select a desired object from those extracted and being displayed in sub-regions of the second display region. Accordingly, the electronic device obtains an instruction to play back the third object.

At S108, video data for the third object is determined.

Video data for the video frames containing the third object to which the received video playback instruction is directed can be determined as follows. The video frames containing the third object are first identified. Playback moments for the video frames are then determined. The video data is to be found within a preset period around the playback moment, for example, within 5 s before and after the playback moment.

At S109, the determined video data is played back in a third display region.

Figure 8:
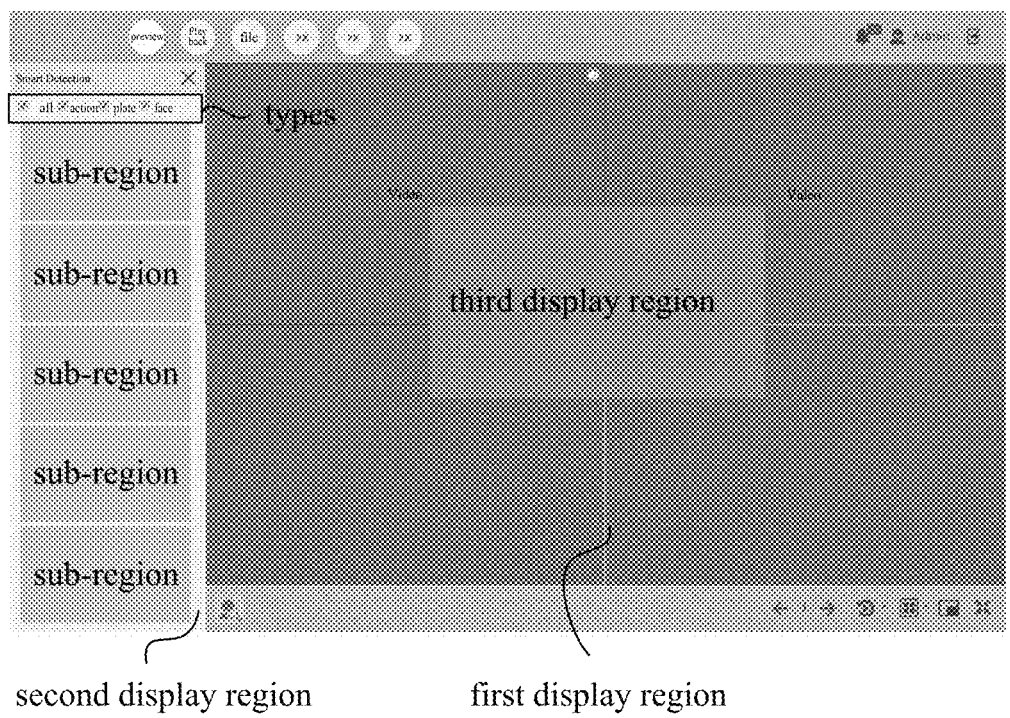
FIG. 8 is a schematic diagram of a display interface for playback of video data.

As shown in FIG. 8 that illustrates a display interface for the video playback. Upon the determination of the video data for the third object, The screen is split to provide a third display region in which the determined video data is to be played back. The splitting operation determines the position of the third display region. The third display region may be provided anywhere on the screen. Alternatively, the third display region may be determined according to the user's selection.

As such, the video data for a user-selected object can be displayed in such a way that the user can learn the information related to the object more clearly.

Figure 9:
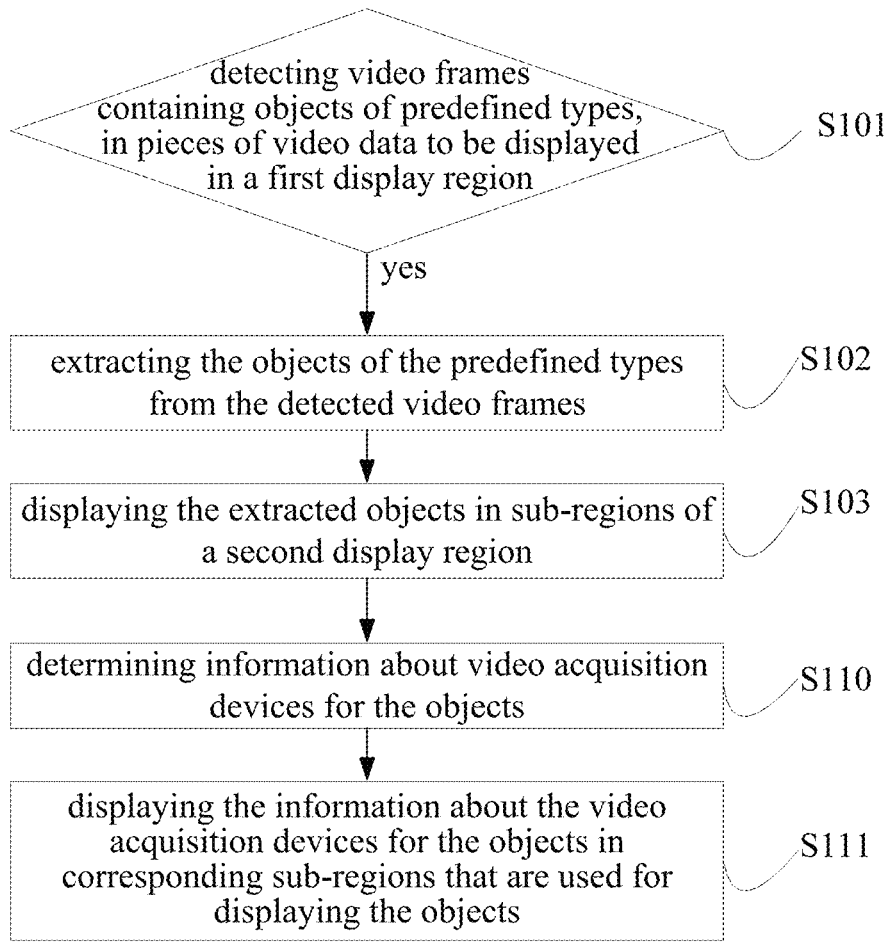
FIG. 9 is a schematic flowchart of a fourth method for displaying objects according to an embodiment of the present application.

An embodiment of the present application provides another method for displaying objects, including, in addition to those illustrated in FIG. 1 and after S103, the following operations as shown in FIG. 9.

At S110, information about video acquisition devices for the objects is determined.

As the first display region is to display a plurality of pieces of video data, information about video acquisition devices for the objects may be determined, so that the user can clear know which devices acquire the objects that are extracted and displayed in the sub-regions in the second display region and where the devices are installed. The information about video acquisitions devices may include at least one of: models, installation positions, and channels of the devices.

At S111, the information about the video acquisition devices for the objects is displayed in corresponding sub-regions that are displaying the objects.

The information about the video acquisition devices for the objects is displayed, after being determined, in the corresponding sub-regions that are used for displaying the objects.

As such, the user can learn the information about the video acquisition devices for the objects through the display thereof.

Figure 10:
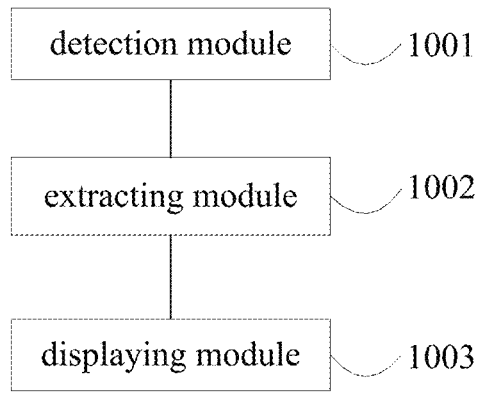
FIG. 10 is a schematic diagram illustrating the structure of an apparatus for displaying objects according to an embodiment of the present application.

In accordance with the method embodiments described above, embodiments of the present application provide an apparatus for displaying objects applicable to an electronic device. As shown in FIG. 10, the electronic device includes a detection module 1001, an extracting module 1002, and a displaying module 1003.

The detection module 1001 is configured for detecting, in pieces of video data to be displayed in a first display region, if there are video frames that contain objects of predefined types; and triggering an extracting module if video frames that contain objects of the predefined types are detected.

The extracting module 1002 is configured for extracting the objects of the predefined types from the detected video frames.

The displaying module 1003 is configured for displaying the extracted objects in sub-regions of a second display region that is different from the first display region, with each object being displayed in one of the sub-regions.

In the embodiment, video frames that contain objects of predefined types are detected in pieces of video data to be displayed in a first display region. If such video frames are detected, the objects of the predefined types are extracted from the detected video frames. The extracted objects are displayed in sub-regions of a second display region that is different from the first display region, with each object being displayed in one of the sub-regions. In this way, the objects that a user is interested in can be extracted from a video, and displayed in a way to be viewed with ease.

In an implementation, the detection module 1001 may include:

an object detection subunit configured for performing object detection for objects of the predefined types to video frames in the pieces of video data to be displayed in the first display region; and a video frame determination subunit configured for determining, based on a result of the object detection, if there are video frames that contain the objects of the predefined types.

In an implementation, the apparatus for displaying objects according to an embodiment may also include:

a determining module configured for determining if the object detection for objects of the predefined types is supported by video acquisition devices that acquired the pieces of video data, before performing object detection for objects of the predefined types to video frames in the pieces of video data to be displayed in the first display region; and if not supported, triggering the object detection subunit.

In an implementation, the apparatus for displaying objects according to an embodiment may also include:

a determination module configured for, if the determining module determines that the video acquisition devices support the object detection, determining if there are video frames that contain the objects of the predefined types, according to a result of the object detection for objects of the predefined types performed by the video acquisition devices to video frames in the pieces of video data to be displayed in the first display region.

In an implementation, the extracting module 1002 is further configured for:

extracting objects of the predefined types that are different from reference objects from the detected video frames, wherein the reference objects are of the predefined types and are extracted from previously detected video frames.

In an implementation, the displaying module 1003 may include:

an arranging subunit configured for arranging the extracted objects in a sequence according to a predefined rule; and an object displaying subunit configured for displaying the objects in the sub-regions of the second display region according to the sequence.

In an implementation, the sub-regions of the second display region are longitudinally distributed, and the object displaying subunit may include:

a first displaying sub-module configured for displaying the objects from bottom to top in the sub-regions of the second display region according to the sequence;

a first object determining sub-module configured for determining if any of the extracted objects has not been displayed in the sub-regions, and if so, triggering a first updating sub-module; and the first updating sub-module configured for removing a first object in the lowest sub-region, sequentially moving other displayed objects than the first object into respective sub-regions adjacently below, displaying an object, that has not been displayed, in the uppermost sub-region, and triggering the first object determining sub-module;

or wherein, the sub-regions of the second display region are transversely distributed, and the object displaying subunit includes:

a second displaying sub-module configured for displaying the objects from left to right in the sub-regions of the second display region according to the sequence;

a second object determining sub-module configured for determining if any of the extracted objects has not been displayed in the sub-regions, and if so, triggering a second updating sub-module; and the second updating sub-module configured for removing a second object in the leftmost sub-region, sequentially moving other displayed objects than the second object into respective sub-regions adjacently on the left, displaying an object, that has not been displayed, in the rightmost sub-region, and triggering the second object determining sub-module.

In an implementation, the apparatus for displaying objects according to an embodiment may further include:

a selection instruction obtaining module configured for obtaining an object selection instruction including a target type for a selected object, after the extracted objects are displayed in the sub-regions of the second display region;

an object identification module configured for identifying objects of other types than the target type from the objects being displayed in the second display region according to the object selection instruction; and a removal module configured for removing the objects of other types from the second display region.

The removal of the objects of other types than the target type from the second display region achieves the purpose of solely displaying objects of a desired target type.

In an implementation, the apparatus for displaying objects according to an embodiment may further include:

a video playback instruction obtaining module configured for obtaining a video playback instruction for a third object after the extracted objects are displayed in the sub-regions of the second display region;

a lookup module configured for determining video data for the third object, which contains video frames having the third object; and a playback module configured for playing back the determined video data in a third display region.

As such, the video data for a user-selected object are displayed in such a way that the user can learn the information related to the object more clearly.

In an implementation, the apparatus for displaying objects according to an embodiment may further include:

a device information determination module configured for determining information about video acquisition devices for the objects after the extracted objects are displayed in the sub-regions of the second display region; and a device information displaying module configured for displaying the information about the video acquisition devices for the objects in corresponding sub-regions that are displaying the objects.

As such, the user can learn the information of the video acquisition devices for the objects through the display thereof.

Figure 11:
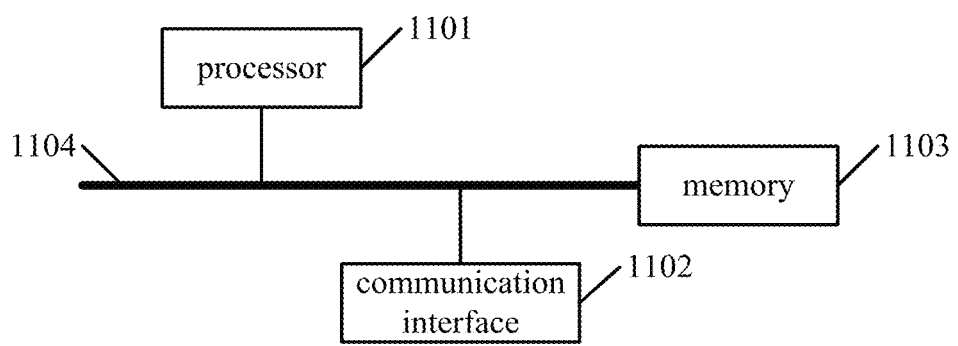
FIG. 11 is schematic diagram illustrating the structure of an electronic device according to an embodiment of the present application.

Embodiments of the present application further provide an electronic device, which includes, as shown in FIG. 11, a processor 1101, a communication interface 1102, a memory 1103, and a communication bus 1104. The processor 1011, the communication interface 1102, and the memory 1103 are communicatively connected via the communication bus 1104.

The memory 1103 is configured for storing a computer program.

The processor 1101 is configured for executing the program stored on the memory so as to implement the method for displaying objects described above. The method includes:

detecting, in pieces of video data to be displayed in a first display region, if there are video frames that contain objects of predefined types;

if video frames that contain objects of the predefined types are detected, extracting the objects of the predefined types from the detected video frames; and displaying the extracted objects in sub-regions of a second display region that is different from the first display region, with each object being displayed in one of the sub-regions.

In an implementation, the step of detecting, in pieces of video data to be displayed in a first display region, if there are video frames that contain objects of predefined types, includes:

performing object detection for objects of the predefined types to video frames in the pieces of video data to be displayed in the first display region; and determining, based on a result of the object detection, if there are video frames that contain the objects of the predefined types.

In an implementation, before the step of performing object detection for objects of the predefined types to video frames in the pieces of video data to be displayed in the first display region, the method for displaying objects according to an embodiment further includes:

determining if the object detection for objects of the predefined types is supported by video acquisition devices that acquired the pieces of video data; and if not supported, performing the object detection for objects of the predefined types to video frames in the pieces of video data to be displayed in the first display region.

In an implementation, the method for displaying objects according to an embodiment of the present application further includes:

if the video acquisition devices support the object detection, determining if there are video frames that contain the objects of the predefined types, according to a result of the object detection for objects of the predefined types performed by the video acquisition devices to video frames in the pieces of video data to be displayed in the first display region.

In an implementation, the step of extracting the objects of the predefined types from the video detected frames includes:

extracting objects of the predefined types that are different from reference objects from the detected video frames, wherein the reference objects are of the predefined types and are extracted from previously detected video frames.

In an implementation, the step of displaying the extracted objects in sub-regions of a second display region includes:

arranging the extracted objects in a sequence according to a predefined rule; and displaying the objects in the sub-regions of the second display region according to the sequence.

In an implementation, the sub-regions of the second display region are longitudinally distributed; and the step of displaying the objects in the sub-regions of the second display region according to the sequence includes:

displaying the objects from bottom to top in the sub-regions of the second display region according to the sequence;

determining if any of the extracted objects has not been displayed in the sub-regions; and if so, removing a first object in the lowest sub-region, sequentially moving other displayed objects than the first object into respective sub-regions adjacently below, displaying an object, that has not been displayed, in the uppermost sub-region, and proceeding back to determination as to if any of the extracted objects has not been displayed in the sub-regions;

or wherein, the sub-regions of the second display region are transversely distributed; and displaying the objects in the sub-regions of the second display region according to the sequence includes:

displaying the objects from left to right in the sub-regions of the second display region according to the sequence;

determining if any of the extracted objects has not been displayed in the sub-regions; and if so, removing a second object in the leftmost sub-region, sequentially moving other displayed objects than the second object into respective sub-regions adjacently on the left, displaying an object, that has not been displayed, in the rightmost sub-region, and proceeding back to the determination as to if any of the extracted objects has not been displayed in the sub-regions.

In an implementation, after the step of displaying the extracted objects in sub-regions of a second display region, the method for displaying objects according to an embodiment of the present application may further include:

obtaining an object selection instruction including a target type for a selected object;

identifying objects of other types than the target type from the objects being displayed in the second display region according to the object selection instruction; and removing the objects of other types from the second display region.

In an implementation, after displaying the extracted objects in sub-regions of a second display region, the method for displaying objects according to an embodiment of the present application may further include:

obtaining a video playback instruction for a third object;

determining video data for the third object, which contains video frames having the third object; and playing back the determined video data in a third display region.

In an implementation, after displaying the extracted objects in sub-regions of a second display region, the method for displaying objects according to an embodiment of the present application may further include:

determining information about video acquisition devices for the objects; and displaying the information about the video acquisition devices for the objects in corresponding sub-regions that are displaying the objects.

In the embodiments, video frames that contain objects of predefined types are detected in pieces of video data to be displayed in a first display region. If such video frames are detected, the objects of the predefined types are extracted from the detected video frames. The extracted objects are displayed in sub-regions of a second display region that is different from the first display region, with each object being displayed in one of the sub-regions. In this way, the objects that a user is interested in can be extracted from a video, and displayed in a way to be viewed with ease.

Embodiments of the present application further provide a computer readable storage medium having a computer program stored thereon which, when being executed by a processor, performs the method for displaying objects described above. The method includes:

detecting, in pieces of video data to be displayed in a first display region, if there are video frames that contain objects of predefined types;

if video frames that contain objects of the predefined types are detected, extracting the objects of the predefined types from the detected video frames; and displaying the extracted objects in sub-regions of a second display region that is different from the first display region, with each object being displayed in one of the sub-regions.

In an implementation, the step of detecting, in pieces of video data to be displayed in a first display region, if there are video frames that contain objects of predefined types, includes:

performing object detection for objects of the predefined types to video frames in the pieces of video data to be displayed in the first display region; and determining, based on a result of the object detection, if there are video frames that contain the objects of the predefined types.

In an implementation, before the step of performing object detection for objects of the predefined types to video frames in the pieces of video data to be displayed in the first display region, the method for displaying objects according to an embodiment further includes:

determining if the object detection for objects of the predefined types is supported by video acquisition devices that acquired the pieces of video data; and if not supported, performing the object detection for objects of the predefined types to video frames in the pieces of video data to be displayed in the first display region.

In an implementation, the method for displaying objects according to an embodiment of the present application further includes:

if the video acquisition devices support the object detection, determining if there are video frames that contain the objects of the predefined types, according to a result of the object detection for objects of the predefined types performed by the video acquisition devices to video frames in the pieces of video data to be displayed in the first display region.

In an implementation, the step of extracting the objects of the predefined types from the video detected frames includes:

extracting objects of the predefined types that are different from reference objects from the detected video frames, wherein the reference objects are of the predefined types and are extracted from previously detected video frames.

In an implementation, the step of displaying the extracted objects in sub-regions of a second display region includes:

arranging the extracted objects in a sequence according to a predefined rule; and displaying the objects in the sub-regions of the second display region according to the sequence.

In an implementation, the sub-regions of the second display region are longitudinally distributed; and the step of displaying the objects in the sub-regions of the second display region according to the sequence includes:

displaying the objects from bottom to top in the sub-regions of the second display region according to the sequence;

determining if any of the extracted objects has not been displayed in the sub-regions; and if so, removing a first object in the lowest sub-region, sequentially moving other displayed objects than the first object into respective sub-regions adjacently below, displaying an object, that has not been displayed, in the uppermost sub-region, and proceeding back to determination as to if any of the extracted objects has not been displayed in the sub-regions;

or wherein, the sub-regions of the second display region are transversely distributed; and displaying the objects in the sub-regions of the second display region according to the sequence includes:

displaying the objects from left to right in the sub-regions of the second display region according to the sequence;

determining if any of the extracted objects has not been displayed in the sub-regions; and if so, removing a second object in the leftmost sub-region, sequentially moving other displayed objects than the second object into respective sub-regions adjacently on the left, displaying an object, that has not been displayed, in the rightmost sub-region, and proceeding back to the determination as to if any of the extracted objects has not been displayed in the sub-regions.

In an implementation, after the step of displaying the extracted objects in sub-regions of a second display region, the method for displaying objects according to an embodiment of the present application may further include:

obtaining an object selection instruction including a target type for a selected object;

identifying objects of other types than the target type from the objects being displayed in the second display region according to the object selection instruction; and removing the objects of other types from the second display region.

In an implementation, after displaying the extracted objects in sub-regions of a second display region, the method for displaying objects according to an embodiment of the present application may further include:

obtaining a video playback instruction for a third object;

determining video data for the third object, which contains video frames having the third object; and playing back the determined video data in a third display region.

In an implementation, after displaying the extracted objects in sub-regions of a second display region, the method for displaying objects according to an embodiment of the present application may further include:

determining information about video acquisition devices for the objects; and displaying the information about the video acquisition devices for the objects in corresponding sub-regions that are displaying the objects.

In the embodiments, video frames that contain objects of predefined types are detected in pieces of video data to be displayed in a first display region. If such video frames are detected, the objects of the predefined types are extracted from the detected video frames. The extracted objects are displayed in sub-regions of a second display region that is different from the first display region, with each object being displayed in one of the sub-regions. In this way, the objects that a user is interested in can be extracted from a video, and displayed in a way to be viewed with ease.

It should be noted that the relationship terms herein such as "first", "second", and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the wording "comprise(s) a" or "include(s) a" do not exclude that there are other identical elements in the processes, methods, articles, or devices which include these elements.

All of the embodiments in the description are described in a correlated manner, and various embodiments may share identical or similar parts. The description for each embodiment focuses on the differences from other embodiments. In particular, a brief description is provided to embodiments of the apparatus for displaying objects shown in FIG. 10, the electronic device shown in FIG. 11, and the computer readable storage medium, in view of their resemblance with embodiments of the method for displaying objects shown in FIG. 1. Relevant details can be known with reference to the description of the embodiments of the method for displaying objects shown in FIG. 1.

The embodiments described above are simply preferable embodiments of the present application, and are not intended to limit the scope of protection of the present application. Any modifications, alternatives, improvements, or the like within the spirit and principle of the present application shall be included within the scope of protection of the present application.

The invention claimed is:

1. A method for displaying objects, applicable to an electronic device and comprising:
    detecting, in pieces of video data to be displayed in a first display region, if there are video frames that contain objects of predefined types;
    if video frames that contain objects of the predefined types are detected, extracting the objects of the predefined types from the detected video frames; and
    displaying the extracted objects in sub-regions of a second display region that is different from the first display region, with each object being displayed in one of the sub-regions,
    wherein extracting the objects of the predefined types from the detected video frames, comprises:
    extracting objects of the predefined types that are different from reference objects from the detected video frames, wherein the reference objects are of the predefined types and are extracted from previously detected video frames,
    wherein displaying the extracted objects in sub-regions of a second display region, comprises:
    arranging the extracted objects in a sequence according to a predefined rule; and displaying the objects in the sub-regions of the second display region according to the sequence;
    wherein after displaying the extracted objects in sub-regions of a second display region, the method further comprises:
    obtaining an object selection instruction comprising a target type for a selected object, wherein the selected object is one of the extracted objects, and the target type is selected from one of the preset types;
    identifying objects of other types than the target type from the extracted objects being displayed in the second display region according to the object selection instruction; and
    removing the objects of other types from the second display region;
    and wherein after displaying the extracted objects in sub-regions of a second display region, the method further comprises:
    obtaining a video playback instruction for a third object;
    determining video data for the third object, which contains video frames having the third object; and
    playing back the determined video data in a third display region.

2. The method of claim 1, wherein detecting, in pieces of video data to be displayed in a first display region, if there are video frames that contain objects of predefined types, comprises:
    performing object detection for objects of the predefined types to video frames in the pieces of video data to be displayed in the first display region; and
    determining, based on a result of the object detection, if there are video frames that contain the objects of the predefined types.

3. The method of claim 2, wherein before performing object detection for objects of the predefined types to video frames in the pieces of video data to be displayed in the first display region, the method further comprises:
    determining if the object detection for objects of the predefined types is supported by video acquisition devices that acquired the pieces of video data; and
    if not supported, performing the object detection for objects of the predefined types to video frames in the pieces of video data to be displayed in the first display region.

4. The method of claim 3, further comprising:
    if the video acquisition devices support the object detection, determining if there are video frames that contain the objects of the predefined types, according to a result of the object detection for objects of the predefined types performed by the video acquisition devices to video frames in the pieces of video data to be displayed in the first display region.

5. The method of claim 1, wherein the sub-regions of the second display region are longitudinally distributed; and displaying the objects in the sub-regions of the second display region according to the sequence, comprises:
    displaying the objects from bottom to top in the sub-regions of the second display region according to the sequence;
    determining if any of the extracted objects has not been displayed in the sub-regions; and
    if so, removing a first object in the lowest sub-region, sequentially moving other displayed objects than the first object into respective sub-regions adjacently below, displaying an object, that has not been displayed, in the uppermost sub-region, and proceeding back to determination as to if any of the extracted objects has not been displayed in the sub-regions;
    or wherein,
    the sub-regions of the second display region are transversely distributed; and displaying the objects in the sub-regions of the second display region according to the sequence comprises:

displaying the objects from left to right in the sub-regions of the second display region according to the sequence;

determining if any of the extracted objects has not been displayed in the sub-regions; and if so, removing a second object in the leftmost sub-region, sequentially moving other displayed objects than the second object into respective sub-regions adjacently on the left, displaying an object, that has not been displayed, in the rightmost sub-region, and proceeding back to the determination as to if any of the extracted objects has not been displayed in the sub-regions.

6. The method of claim 1, wherein after displaying the extracted objects in sub-regions of a second display region, the method further comprises:

determining information about video acquisition devices for the objects; and displaying the information about the video acquisition devices for the objects in corresponding sub-regions that are displaying the objects.

7. An electronic device, comprising a processor, a communication interface, a memory, and a communication bus, wherein the processor, the communication interface, and the memory communicate with each other via the communication bus;

the memory is configured for storing a computer program; and the processor is configured for executing the program stored on the memory to carry out the method of claim 1.

8. A non-transitory computer readable storage medium having a computer program stored thereon which, when being executed by a processor, performs the method of claim 1.

* * * * *